(12) United States Patent
Nickerson

(10) Patent No.: US 6,571,281 B1
(45) Date of Patent: *May 27, 2003

(54) INFORMATION SHARING SYSTEM FOR PERSONAL ELECTRONIC TIME MANAGEMENT SYSTEMS

(75) Inventor: Michael J. Nickerson, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/384,759

(22) Filed: Aug. 27, 1999

Related U.S. Application Data

(60) Provisional application No. 60/113,489, filed on Dec. 22, 1998.

(51) Int. Cl.[7] .............................................. G06F 13/00
(52) U.S. Cl. ...................................... 709/217; 707/10
(58) Field of Search ................................. 709/217, 245; 707/10, 200, 201, 203, 217

(56) References Cited

U.S. PATENT DOCUMENTS

| | | | |
|---|---|---|---|
| 4,817,018 A | | 3/1989 | Cree et al. .................. 345/751 |
| 4,819,191 A | | 4/1989 | Scully et al. ............... 345/751 |
| 4,831,552 A | | 5/1989 | Scully et al. ............... 345/751 |
| 4,866,611 A | | 9/1989 | Cree et al. .................. 708/112 |
| 5,077,795 A | | 12/1991 | Rourke et al. ............... 380/55 |
| 5,247,438 A | | 9/1993 | Subas et al. ................. 700/90 |
| 5,392,390 A | * | 2/1995 | Crozier ....................... 345/762 |
| 5,666,553 A | * | 9/1997 | Crozier ....................... 707/540 |
| 5,745,754 A | | 4/1998 | Lagarde et al. .......... 707/104.1 |
| 5,790,974 A | * | 8/1998 | Tognazzini ................. 701/204 |
| 5,842,009 A | | 11/1998 | Borovoy et al. ............... 707/1 |
| 6,131,096 A | * | 10/2000 | Ng et al. ...................... 707/10 |
| 6,396,512 B1 | * | 5/2002 | Nickerson ................... 345/751 |
| 6,466,236 B1 | * | 10/2002 | Pivowar et al. ............. 345/835 |

* cited by examiner

Primary Examiner—Kenneth R. Coulter
(74) Attorney, Agent, or Firm—Gary B. Cohen; Philip E. Blair

(57) ABSTRACT

A data processing system is disclosed. The system comprising a downloading subsystem for creating a first event related entry including a first upload indicator and a second event related entry including a second upload indicator and a first uploading subsystem and a second uploading subsystem, both of which are communicatively coupled with the downloading subsystem. The downloading subsystem includes a database communicatively coupled to each of the first uploading subsystem and the second uploading subsystem, the database storing the first and second event related entries along with their respective first and second upload indicators wherein the first upload indicator is used for permitting the first uploading subsystem to upload a copy of at least a portion of the first event related entry, but not any portion of the second event related entry, and the second upload indicator is used for permitting the second uploading subsystem to upload at least a portion of the second event related entry, but not any portion of the first event related entry.

32 Claims, 10 Drawing Sheets

| TIME | EVENT DESCRIPTION | DATE | ALARM | CIRCLE OF INTERNET |
|---|---|---|---|---|
| 10 2 00 AM | MEETING | | √ | SELF |
| 12 5 00 PM | LUNCH | | √ | SELF |
| 2 2 00 PM | TELEPHONE CONF | | √ | SELF |

FIG. 2

| TIME | EVENT DESCRIPTOR 1 | ALARM | COIM 1 |
|---|---|---|---|
| • | • | • | COIM 2 |
| • | • | • | • |
| • | • | • | • |
| • | • | • | COIM N |
| • | • | • | • |
| • | • | • | • |
| TIME | EVENT DESCRIPTOR 4 | ALARM | COIM 1 |
| • | • | • | • |
| • | • | • | • |
| • | • | • | COIM N |
| • | • | • | • |
| • | • | • | • |

INFORMATION SHARING SYSTEM FOR PERSONAL ELECTRONIC TIME MANAGEMENT SYSTEMS

This application claims priority under 35 U.S.C. §119 to provisional application number 60/113,489, filed on Dec. 22, 1998.

BACKGROUND OF THE PRESENT INVENTION

This invention relates generally to the control of information in a data processing system and, more particularly, to a system in which the information is provided with "tags" pursuant to downloading the information with a suitable downloading platform (e.g. a personal electronic time management device operatively coupled with a personal computer) to a database. In turn, the tags are used to facilitate distribution of the information from the database to selected users or sites designated by the tags. Moreover, the present invention is directed to access management of the information after it is off-loaded from a personal electronic time management system.

DESCRIPTION OF PRIOR ART

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network that has been established to permit the users to interact with each other and with data maintained on the data processing system. In this environment, a user at a terminal or workstation can send a message to one or more of the other users on the network and is notified when the users have received and read the messages.

In most of these environments, each user generally maintains a calendar, and in many of these environments the reason for the interaction with each other quite often involves reference to respective calendars. A considerable amount of time is therefore spent in many organizations, with people checking and rearranging their calendars to accommodate various events such as meetings, presentations, etc. In this environment, the calendar systems and method have progressed to the point where a person who is calling a meeting can at least review within the constraints that the security system dictates, the calendars of other users on the system that he intends to invite to a meeting, to determine whether a given time period is available on the respective calendars of the perspective attendees. However, once the meeting time is set and the prospective participants notified of the date, time, and subject of the meeting, each participant must update his or her own electronic calendar and reply to the meeting request. While the system can facilitate the request and reply message process, it is sometimes less frustrating when a negative reply has to be transmitted to merely use the telephone to arrive at another mutually convenient time. As a result, a considerable amount of time and effort is spent by calendar owners replying to requests for participation in events that are being calendared by other persons.

The following patents represent various improvements to electronic calendaring methods for increasing productivity and making the overall system more appealing to the calendar owner by providing functions that the calendar owner came to expect and rely on when her calendar was being kept manually.

U.S. Pat. No. 4,817,018 to Cree et al. discloses an electronic calendaring method for use in a data processing system that has a plurality of interactive type work stations (terminals or personal computers) connected directly or indirectly to a host processor. The method assists a calendar owner who receives a notice at his work station requesting his involvement in a future event that is being calendared by another calendar owner on the system, to manually or automatically designate in the reply a temporary alternate to attend the meeting being calendared or a permanent alternate to attend all future meetings without affecting his status in the system as a recipient of the meeting notice.

U.S. Pat. No. 4,819,191 is directed to an electronic calendaring method in which a calendar owner can selectively trigger a predefined action and response to detecting one or more criteria related to the calendar event that has previously been defined and entered into the system.

U.S. Pat. No. 4,866,611 is directed to an electronic calendaring method in which a calendar owner who keeps a detached personal copy of her master calendar can automatically reconcile the calendar entries that have been made on each calendar copy, independently of the other since the last time the detached copy was made and interactively resolve calendar event conflicts.

U.S. Pat. No. 4,831,552 to Scully et al. discloses an electronic calendaring method for use in a data processing system that has a plurality of interactive type work stations connected directly or indirectly to a host processing unit. The method assists a calendar owner to request the system to develop and display a composite calendar comprising entries from a plurality of calendars within a specified time span which have been selected by criteria entered interactively into the system by the calendar owner. The criteria entered are not limited to "free periods" nor system established terminology, but can include terms established by the calendar owner community.

As indicated by way of the discussion above, maintaining calendars on and between personal computers represents a very effective way to develop and maintain a composite calendar. Nevertheless, in a mobile society where even a "laptop" computer can represent, for some, more "baggage" than desired, personal electronic time management systems ("PETMS"s) are gaining in popularity. Indeed, many users now effectively use PETMSs in networked calendaring approaches.

A first example of a PETMS well suited for use in a calendaring process is disclosed in U.S. Pat. No. 5,247,438 to Subas et al., the personal time management system being directed toward both a system and method for permitting event information to be inputted in graphic form directly onto a primary display screen without the need to pull up a separate, intrusive pop-up screen for entering calendar events. The invention additionally provides a positive indication of a conflict between calendared events which is immediately visually apparent and which does not require a visual comparison between shaded segments of a Gantt chart. The most essential calendaring information can be entered and displayed on a single primary visual display for improved at-a-glance calendar status checks.

A second example of a PETMS well suited for use in a calendaring process is disclosed in U.S. Pat. No. 5,842,009. The illustrated PETMS in the '009 Patent is an Apple Newton handheld computing device ("Newton" is a trademark of Apple Computers, Inc.) including a calendar program. Referring specifically to FIGS. 3 and 4 of the '009 Patent, dialogs suitable for entering and maintaining event related data are shown. Obtaining information on an Apple Newton device is particularly easy to do as a result of Newton's "data soup" architecture. Newton soups, as is well known in the art, allow access to data by applications other than the one that created that data. For example, when a user desires to query a Newton soup, that user need only know its name (e.g., "calendar") and a field by which it is indexed (e.g., "mtgStartDate").

A final example of a PETMS well suited for use in a calendaring process is embodied in the publicly available PalmPilot handheld computer ("PalmPilot" is a trademark of 3Com Inc.). The PalmPilot handheld computer includes a backlit screen upon which application icons are displayed. Preferably input to the PalmPilot handheld computer is provided by way of a stylus which is used to "scribble" characters on the backlit screen. The characters are provided in a shorthand known as "Graffiti". The PalmPilot handheld computer is capable of storing files and those files can be synchronized readily with files on a host personal computer by simply dropping the handheld computer in a cradle and pushing a single button. The PalmPilot handheld computer is typically about the size of a wallet (weighing about 5.5 ounces) and, in one example, can hold roughly 500 addressbook entries, 600 appointments, 100 to-do items, and 50 memos.

In some instances, maintaining calendars on and between personal computers may require the configuring of a database at a common server to store related calendaring information efficiently. The principles underlying the maintenance of a database at a server are believed to be similar to the principles underlying the maintenance of a "shared drawer" (in which multiple files are stored). In one instance of the shared drawer concept, Novell, Corp. provides a "shared drive" arrangement in which a set of users are given access to a particular drawer by a "system administrator". With the shared drive approach, a user typically has access to each file in the drive. Other approaches in which the extent to which a user can "read" or "write" relative to the files of the shared drawer are known.

Another convenient way to share files or documents is achieved through an "Internet" or "website" model. In this model, documents can exist via hypertext or other links from a home page. Certain documents can be secured with a password, and a "web master" is typically responsible for supervising issues of security. Essentially, the web master is ultimately responsible for which documents can be downloaded to or uploaded from the website. U.S. Pat. No. 5,077,795 discloses a system for securing documents in a network environment. In the '795 Patent, a system administrator controls document flow through use of a suitable database. It stands to reason that the security system could readily be implemented in an internet based environment of the type disclosed in U.S. Pat. No. 5,745,754 to Lagarde et al.

The concept of networking has been greatly expanded by way of the Internet model, the model permitting users to access a wealth of information by switching from server to server (and thus database to database). The switching may be achieved with a "browsing" system that permits user access by simply clicking on a highlighted word or phrase of interest at a web client.

As is known, a popular instantation of the Internet is the world wide web ("www"). On the www, hypertext markup language (html) specifies the display of information on the web client or platform, and hypertext transfer protocol (http) provides a neutral mechanism for the transfer of information from a server computer to a client computer over the TCP/IP network protocol.

Of particular interest is the neutral aspect, in which the transfer and display of information does not depend on the client computers operating system or processor configuration, but only on the capabilities of the protocol-compliant browser. Publicly available server software often includes a common gateway interface (CGI) which allows the server to invoke a software program which may be passed user specified parameters, and whose output will be transferred to, and displayed on the client computer. Further details regarding the internet, or the www, is disclosed in the '754 Patent.

It follows from the discussion above, that privacy issues go "hand-in-hand" with the area of document or information sharing. That is, when the user of any information repository places selected information in a given repository, that user has certain expectations of privacy with respect to the selected information. This expectation of privacy is not met in many of the shared document/interactive calendaring models. For instance, in the above-mentioned shared drive approach, any user with access to the shared drive can "peruse" through others documents in an unfettered manner.

While U.S. Pat. No. 4,831,552 contemplates that calendar entries can be provided with one of three security levels, the flexibility of such system, with respect to security, appears to be no greater than that possessed by the shared document systems. More particularly, an entry can be "public", "shared" or "private". While the meaning of the indicator "public" is believed to be apparent on its face, it is not believed that the meaning of "shared" cannot be gleaned from the disclosure. Additionally, the degree of security associated with "private" appears to be extreme since "Only date and time may be provided . . . " when a "Private Entry" indicator is designated. It would be desirable to provide a flexible security system for a calendarization scheme in which access rights could be set in a customized fashion for each piece of information downloaded to a corresponding repository and/or database.

It is believed that this sort of customizable security system might also be useful in the application of PETMSs. As understood, if the user of a PETMS desires to share calendar information with another, a joint calendar/"to do list" can be created, as single user, and each individual can upload or download all information associated with this joint calendar. The joint calendar is basically a single user since the PETMS can only support one user. Under such single user system approach, if an individual desires to share certain information, electronically, with a spouse or family member, different information with a colleague at work, and a third set of information with support staff, this cannot be done without forming a joint user that would include all the desired recipients and all the recipients would receive all the downloaded or uploaded information. This can cause problems because sensitive information can be passed to the wrong person. It is believed that the only way to selectively transfer information in this single user system approach is to print out the joint calendar, edit it, and have the intended recipient reenter the edited version in his or her PETMS. It would be desirable to provided an information sharing system for PETMSs in which one or more specific pieces of information are shared strictly with those recipients for which the specific information pieces were intended.

Moreover, PETMS, when sharing calendar information with a host PC or network download all calendar information on the PETMS. There are many instances where one only desires to download certain calendar information to the host. It is imperative to have a system which is also capable of restricting the off-loading of calendar information depending on the identification of the host receiving the information. For example, a user may desire that event A be off-loaded from the PETMS to a home PC, but not to the user's office PC. Thus, it is desirable to provide a system which is capable of discriminating against certain hosts depending upon the nature of the data being off-loaded.

SUMMARY OF THE INVENTION

A data processing system is disclosed. The system comprising a downloading subsystem for creating a first event related entry including a first upload indicator and a second event related entry including a second upload indicator and a first uploading subsystem and a second uploading subsystem, both of which are communicatively coupled with the downloading subsystem. The downloading subsystem includes a database communicatively coupled to each of the first uploading subsystem and the second uploading subsystem, the database storing the first and second event related entries along with their respective first and second upload indicators wherein the first upload indicator is used for permitting the first uploading subsystem to upload a copy of at least a portion of the first event related entry, but not any portion of the second event related entry, and the second upload indicator is used for permitting the second uploading subsystem to upload at least a portion of the second event related entry, but not any portion of the first event related entry.

BRIEF DESCRIPTION OF THE DRAWINGS

FIG. 2 is an elevational view of a dialog displayed on a user interface, the dialog including a table for entering event related information to be stored in a database;

FIG. 8 is an elevational view of a database contemplated by the flow diagram of FIG. 7;

DETAILED DESCRIPTION OF THE PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
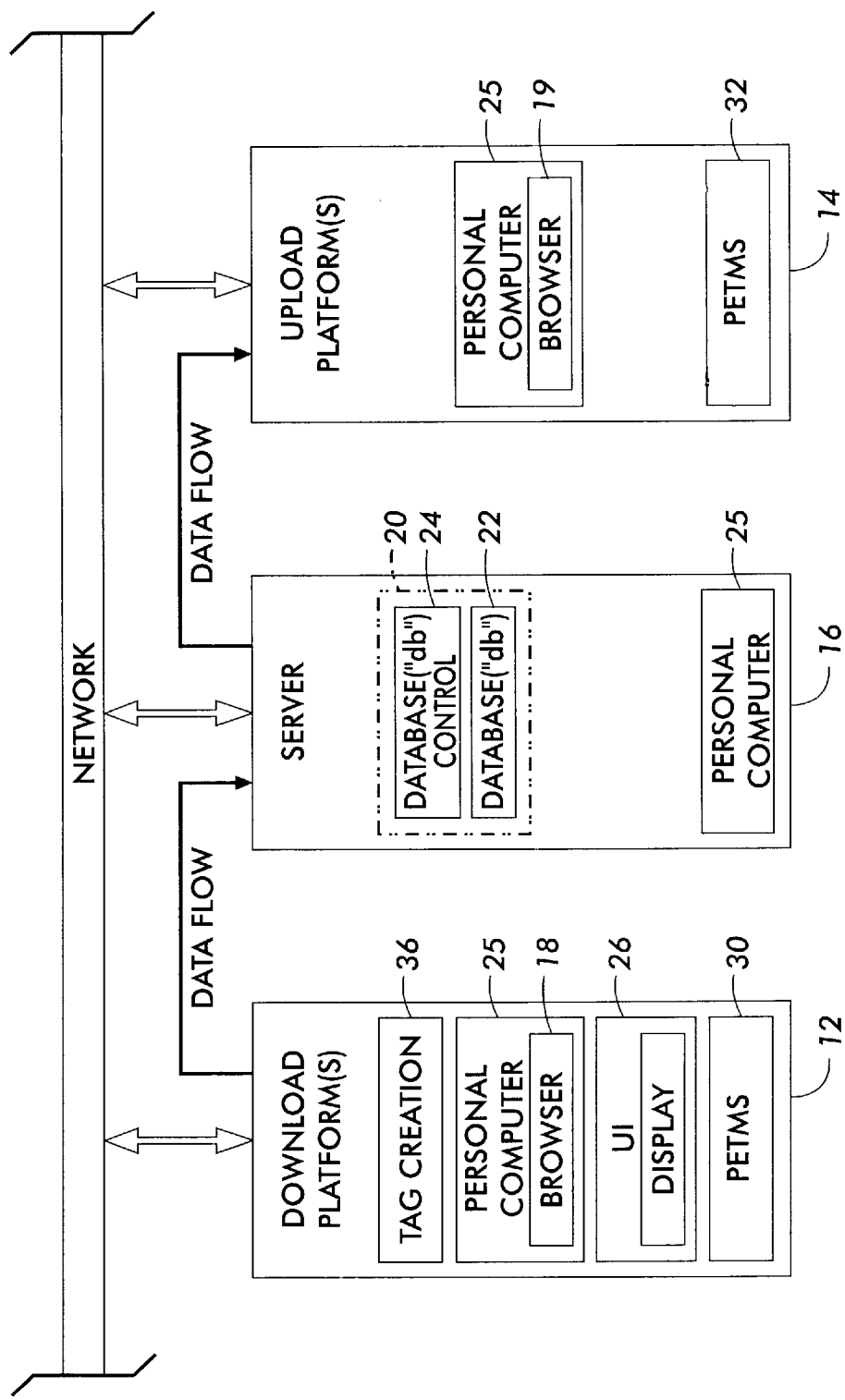
FIG. 1 is a block diagram depicting a system for controlling the flowing of event related information across a network.

Referring to FIG. 1, a data processing system for controlling the flow of event related information among various networked subsystems is designated by the numeral 10. The data processing system 10 includes download platform(s) 12 that is interfaced with upload platform(s) 14 by way of server 16. As will appear, while no more than one upload platform is required to implement the conceptual framework of the preferred embodiments, typically upload platform(s) 16 will include a plurality of platforms.

In the illustrated embodiment of FIG. 1, each of the subsystems 12, 14 and 16 are communicatively coupled with the Internet (designated simply as "Network" in FIG. 1). Each of the download platform(s) 12 and the upload platform(s) 14 include web browsers designated by the numeral 18, 19. As is known, a web browser comprises an application running on a computer that acts as an Internet "tour guide". The browser software, which is made readily available from either Microsoft or Netscape, includes pictorial desktops, directories and search tools configured for "surfing" the Internet. In the illustrated embodiment of FIG. 1, the network is part of the world wide web and each of browsers communicate with the server 16.

The server 16 preferably includes a flexible web site at which information can be stored for eventual transmission to selected web clients (such as the upload platform(s) 14). As contemplated herein, the information is stored by way of a memory section configured as database section, designated by the numeral 20. The database section 20, which includes one or more databases 22 and a database controller 24, can be configured through use of any suitable database package, such as one made available by Oracle Corp. It will be further noted that a configurable web site software package suitable for use on servers (such as server 16) is made publicly available by way of a product referred to as "Docushare" ("Docushare" is a trademark of Xerox Corp). While the one or more databases 22 are configured in a conventional manner, the database controller 24 is programmed in such a manner that permits the type of information distributing or filtering described in detail below.

Important functionality for the preferred embodiments may be achieved by implementing at least portions of the platforms 12, 14 and server 16 on personal computers or workstations 25. For descriptive completeness, the following generalized discussion of a computer is described. Since the computer subsystems described in this discussion are well known and do not, in and of themselves, constitute the claimed invention, such computer subsystems are not shown in the present drawings.

Each of platforms 12, 14 and/or server 16 may include a CPU/memory unit that generally comprises a microprocessor, related logic circuitry, and memory circuits. An input device provides inputs to the CPU/memory unit, which by way of example can be a keyboard, a mouse, a trackball, a joystick, a stylus, a touch screen, a touch tablet, etc., or any combination thereof. An external memory unit, which can include fixed disk drives, floppy disk drives, memory cards, etc., is used for mass storage of programs and dat. Display input/output is provided by of a suitable user interface (designated with the numeral 26 in FIG. 1) having a corresponding display, which display by way of example can be a video display or a liquid crystal display. An additional input to the computer system 25 might include a wired or wireless network connection to, for example, a local server via a local area network or the Internet.

The download platform(s) 12 and upload platform(s) 14 may also employ a personal electronic time management ("PETMS") designated by the numerals 30, 32. As indicated in the Background, one of the most popular PETMS on the market today is referred to as the "PalmPilot" handheld computer or PalmPilot PETMS. The PalmPilot PETMS includes system and application software that run on read only memory ("ROM"). Memory upgrades, which snap into the PalmPilot PETMS much like a RAM upgrade for a personal computer, have been described in the literature. Lotus Notes ("Lotus Notes" is a trademark of IBM) support as well as myriad third-party applications and hardware add-ons, such as PageMart ("PageMart" is a trademark of Motorola) paging modules are also available.

The PalmPilot PETMS includes a backlit LCD (which, in one example, is included in the UI 26), six navigational keys, and a stylus. Several personal information manager ("PIM") application icons reside within the display. Standard PIM applications, an expense tracker, and an e-mail client are included. The latter lets one read, delete, compose, and organize messages; transmission requires additional software and an external 14.4-Kbps 3Com modem. Data is entered by way of either an on-screen keyboard or the on-screen Graffiti-based writing pad, which responds to a form of shorthand and comes with a stick-on guide for easy reference.

A useful feature of the PalmPilot PETMS resides in its extension to a personal or desktop computer, and thus, potentially, to a local or wide area network. For use with the desktop computer, PalmpPilot's PIM is installed on the computer and a cradle is coupled with a suitable serial port. The PalmPilot PETMS can then be dropped into the cradle and desktop files synchronized with those of the PETMS by simply pressing a button associated with the cradle. The PalmPilot PETMS also includes "hooks" for use with third party software and can be used directly with the network by way of a portable modem.

Figure 3:
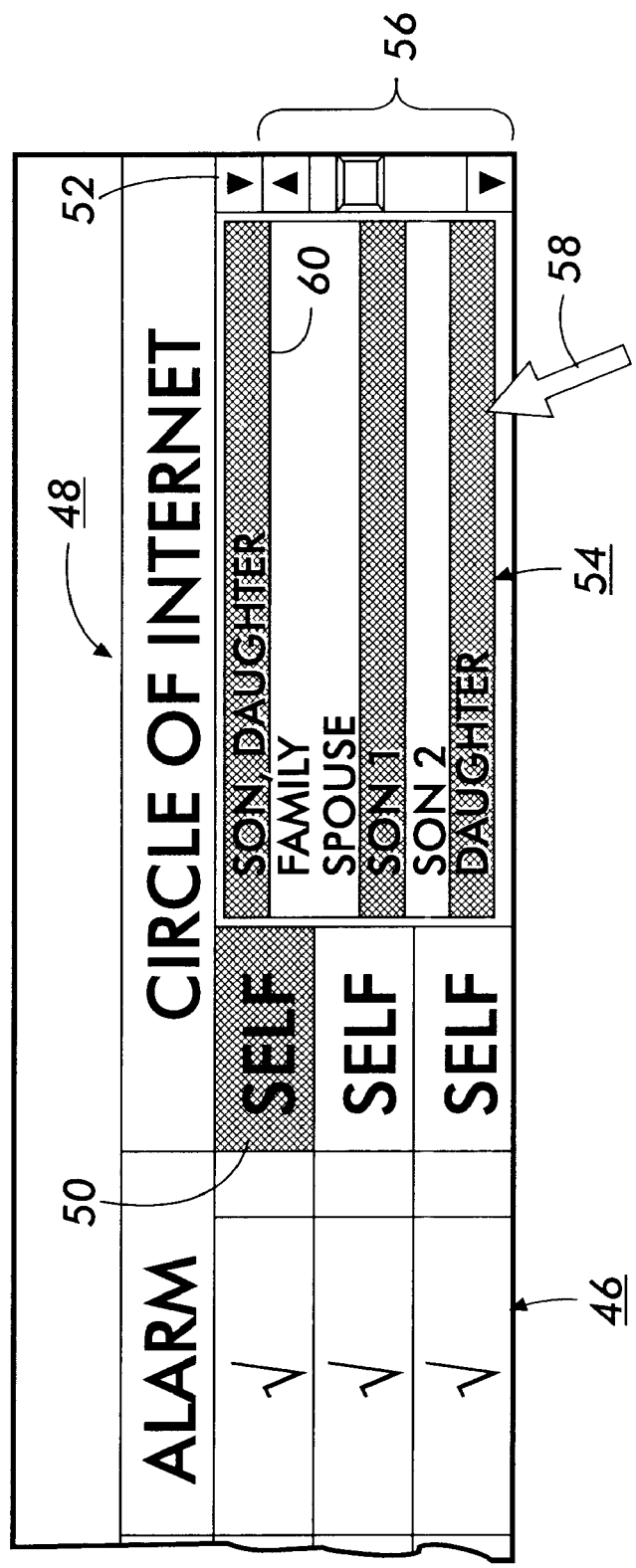
FIG. 3 is an elevational view of a pull-down menu used in conjunction with the table of FIG. 2.

Referring now to FIGS. 1–3, a detailed description of a preferred information "tagging" routine is now provided. To use the tagging routine, a download user initially configures a dialog screen 34 in an application referred to as "Tag Creation" 36. The screen 34 is displayed with UI 26, which UI 26 may be provided by way of the PETMS 30 or, alternatively, the personal computer 25 of download platform(s) 12. Moreover, Tag Creation 36 may reside on either the system software of the PETMS 30 or the operating system of the personal computer associated with download platform(s) 12. As should be recognized, the basic functions of Tag Creation 36 can be configured readily on the basis calendaring software principles disclosed in U.S. Pat. No. 4,817,018 and/or U.S. Pat. No. 5,247,438.

The illustrated screen 34 (FIG. 2) is shown for a single date (i.e. only a single "DATE" entry is shown), but in practice the screen 34 would typically correspond with event-related information spanning days, months or even years. A DATE bar 40 overlays four exemplary information categories, namely "TIME" category 42, "EVENT DESCRIPTION" category 44, "ALARM" category 46 and "CIRCLE OF INTEREST category 48. In view of the calendarizing nature of the preferred embodiments, the relevance of the TIME and EVENT DESCRIPTION categories 42, 44 should be obvious. The function of the ALARM category 46 should also be apparent in view of the common usage of alarms in the calendarizing art are The functionality of the CIRCLE OF INTEREST category 48, which is believed to be important to an understanding of the implementation of the preferred embodiments, is discussed in further detail immediately below.

Referring still to FIG. 2, the system, for each piece of event related information (i.e. each entry under "EVENT DESCRIPTION") provides a "SELF" default indication. This default indicator designates that a given piece of event related information is to be made accessible to its owner even when the given piece of event related information is stored on the personal computer 25 of download platform(s) 12 and/or the personal computer 25 of server 16. In one instance, the owner can maintain just the SELF designation so that the corresponding event related information is accessible to just the owner. In another instance, however, the owner may make the corresponding event related information available to one or more recipients who, by one means or another, have access to a calendar database which is capable of receiving the event related information being downloaded or off-loaded from the PETMS.

Referring now to FIG. 3, a process for programming the CIRCLE OF INTEREST so that event related information can be shared with selected recipients is provided. To initiate "sharing functionality" (which, as will appear, is distinguishable from "sharing functionality" as that term is commonly used in the calendarizing or information sharing areas), the owner of the dialog 34 selects one of the "SELF" indicators. In the illustrated embodiment of FIG. 3, the selected indicator is highlighted and designated with the numeral 50. In response to selecting button 52 (which is aligned with the selected indicator 50) a pull-down menu 54 is displayed. Pull-down menu 54 includes a list of potential event related information recipients or circle of interest members ("COIMs"). The owner or user of the screen 34 can scroll through the list by use of scroll mechanism 56. As will appear each recipient who is intended to receive the event related information corresponding with the selected indicator 50 can be selected with the menu 54.

To initiate this programming, the user selects those COIMs who are intended recipients of the event related information. In the example of FIG. 3, this selection is performed by highlighting each intended recipient with a cursor 58. As will be appreciated by those skilled in the user interface design art, one of several publicly available UI software packages could be employed to create the menu data structure and implement the entry selection process. For instance, the publicly available Windows package ("Windows" is a trademark used by Microsoft) permits a user to select multiple entries by using the cursor 58 in conjunction with the "Ctrl" or "Shift" keys.

Referring still to the programming arrangement of FIG. 3, a composite of entries is shown in COIM entry block 60 as the user makes selections with the cursor 58. In the example of FIG. 3, the user first selects "SELF" and then designates "SON1" and "DAUGHTER" as the recipients of the first piece of event related information referred to as "MEETING". In turn the composite entry "SON1, DAUGHTER" is stored in the memory of PETMS (or, alternatively, the memory of personal computer 25 for immediate or eventual downloading to the server 16 or any alternative location that the user may desire).

The composite of entries selected in COIM block 60 is sometimes referred to below as a "storage" or "upload" indicator. This is because the composite of entries, in a first downloading embodiment, facilitates storage of event related information in the database(s) 22, and the composite of entries, in a second uploading embodiment, facilitates uploading of event related information to designated recipients. Further detail regarding use of the storage and upload indicators will be provided below.

An example in which a piece of programmed information is transmitted from the PETMS 30 to the server 16 (via a personal computer 25) follows below. It will be appreciated that, notwithstanding such example, the piece of programmed information could be transmitted to one of several storage sites within the network (including a configurable database), using one of several different combinations of computer/communication devices to achieve such transmission, without affecting the conceptual framework upon which the preferred embodiments are based. Additionally, while the disclosed embodiments contemplate that a user downloads programmed information to the server 16 with the personal computer 25, the programmed information could be downloaded directly from the PETMS 30 to the network through use of a suitable modem.

In the example, the piece of programmed information is downloaded from the PETMS 30 to the personal computer 25 (via a PETMS/personal computer downloading approach of the type described above) and that the same piece of programmed information is passed along to the server 16 by way of a conventional web information transmission process. That is, assuming the server 16 is set up as a web site, the transmission of the piece of programmed information can be achieved readily through suitable communication between the browser 18 (FIG. 1) and the server web site 16. This one example assumes that the personal computer 25 of the download platform(s) 12 is aware of the URL to which the piece of programmed information is to be routed.

Figure 4:
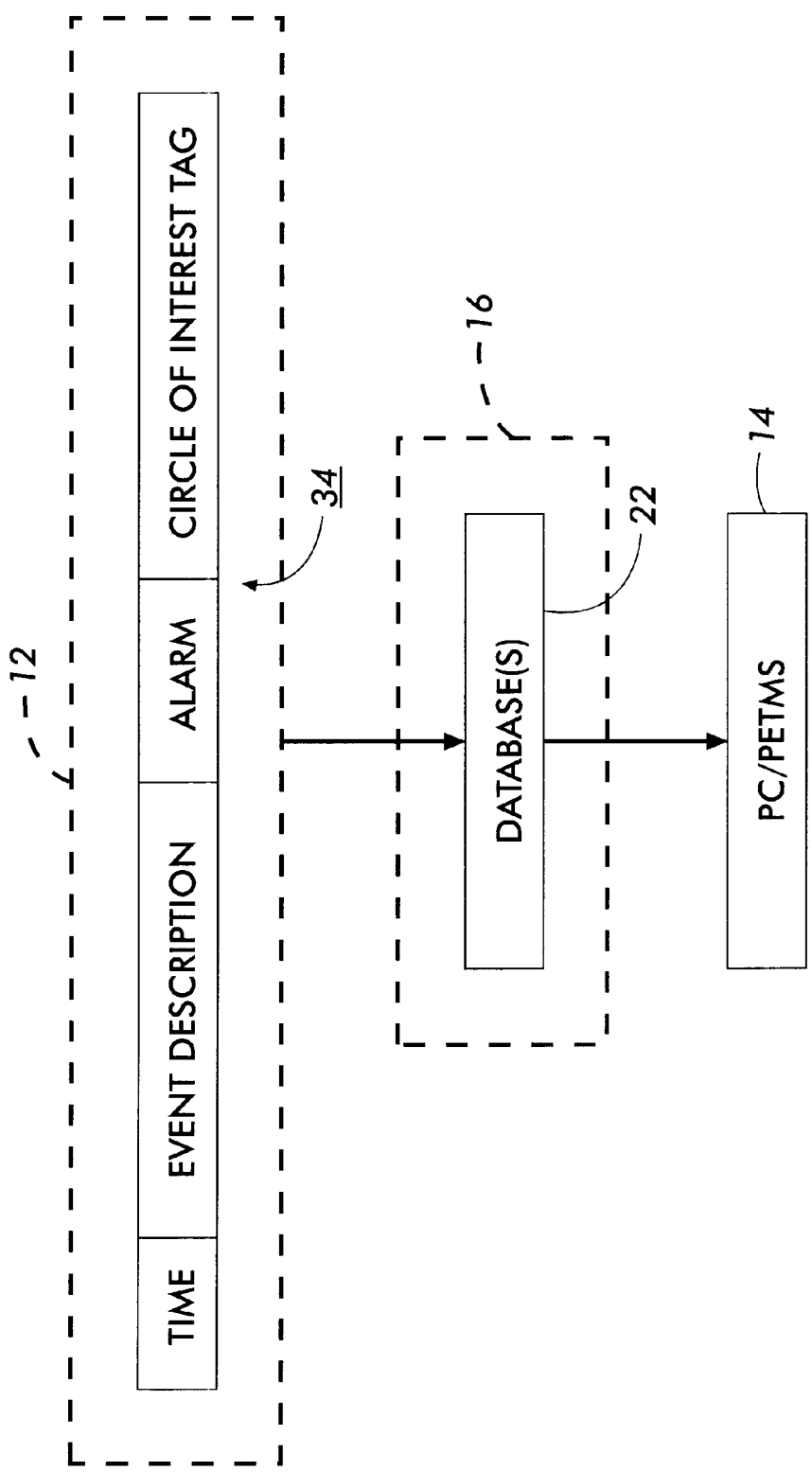
FIG. 4 is a block diagram depicting selected aspects of an event related information control scheme of the present invention—downloading and uploading procedures are contemplated within the block diagram depiction.

Referring generally to FIG. 4, a schematic overview of the system for routing programmed information from the download platform(s) 12 to the upload platform(s) (by way of the server 16) is shown. In the illustrated overview, each piece of programmed information is routed to one or more databases 22. It will be appreciated that the database(s) 22 is shown at the server 16 for the sake of convenience, and that the database(s) 22 could be located anywhere in the data processing system 10 without effecting the conceptual framework upon which the preferred embodiments are based.

Figure 5:
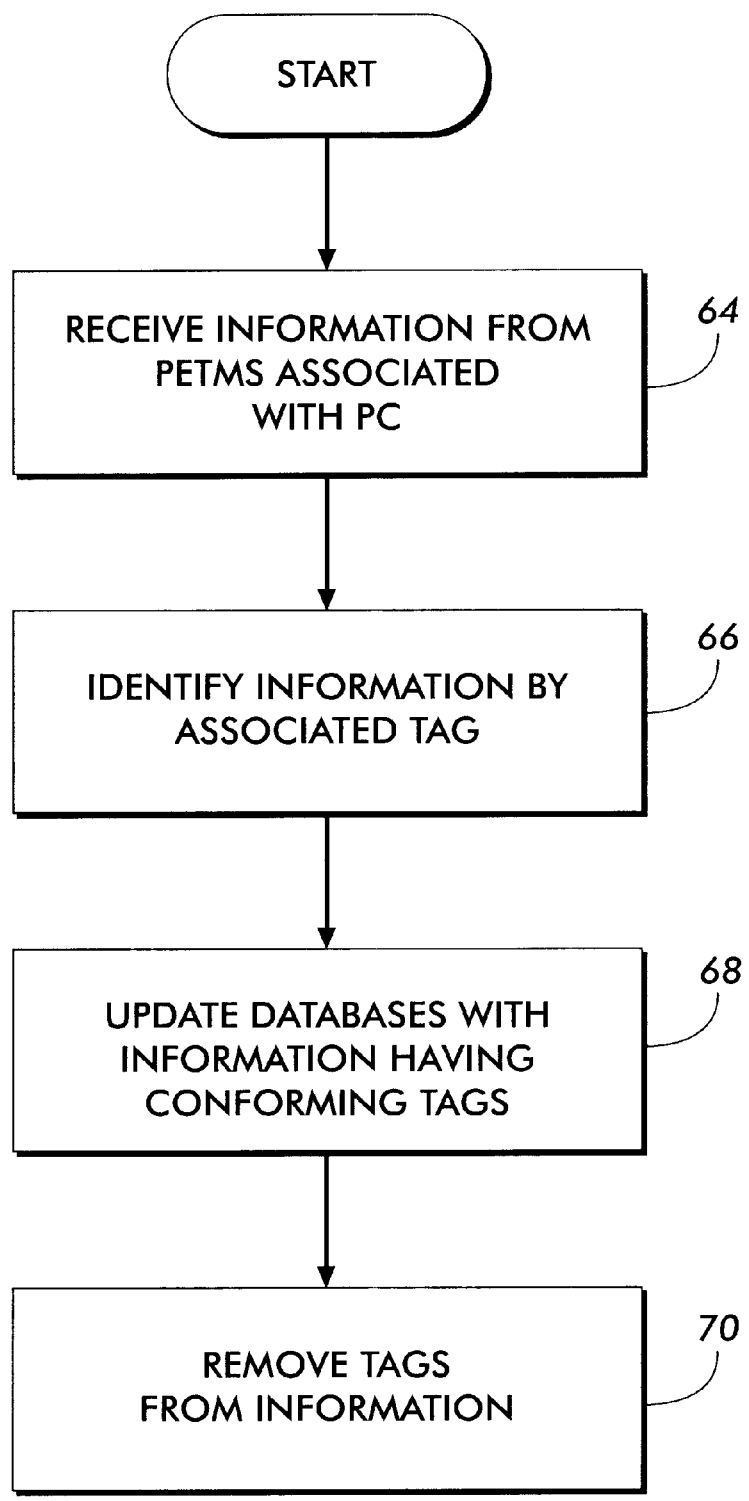
FIG. 5 is a flow diagram illustrating a first embodiment of the downloading procedure contemplated by FIG. 4.
Figure 6:
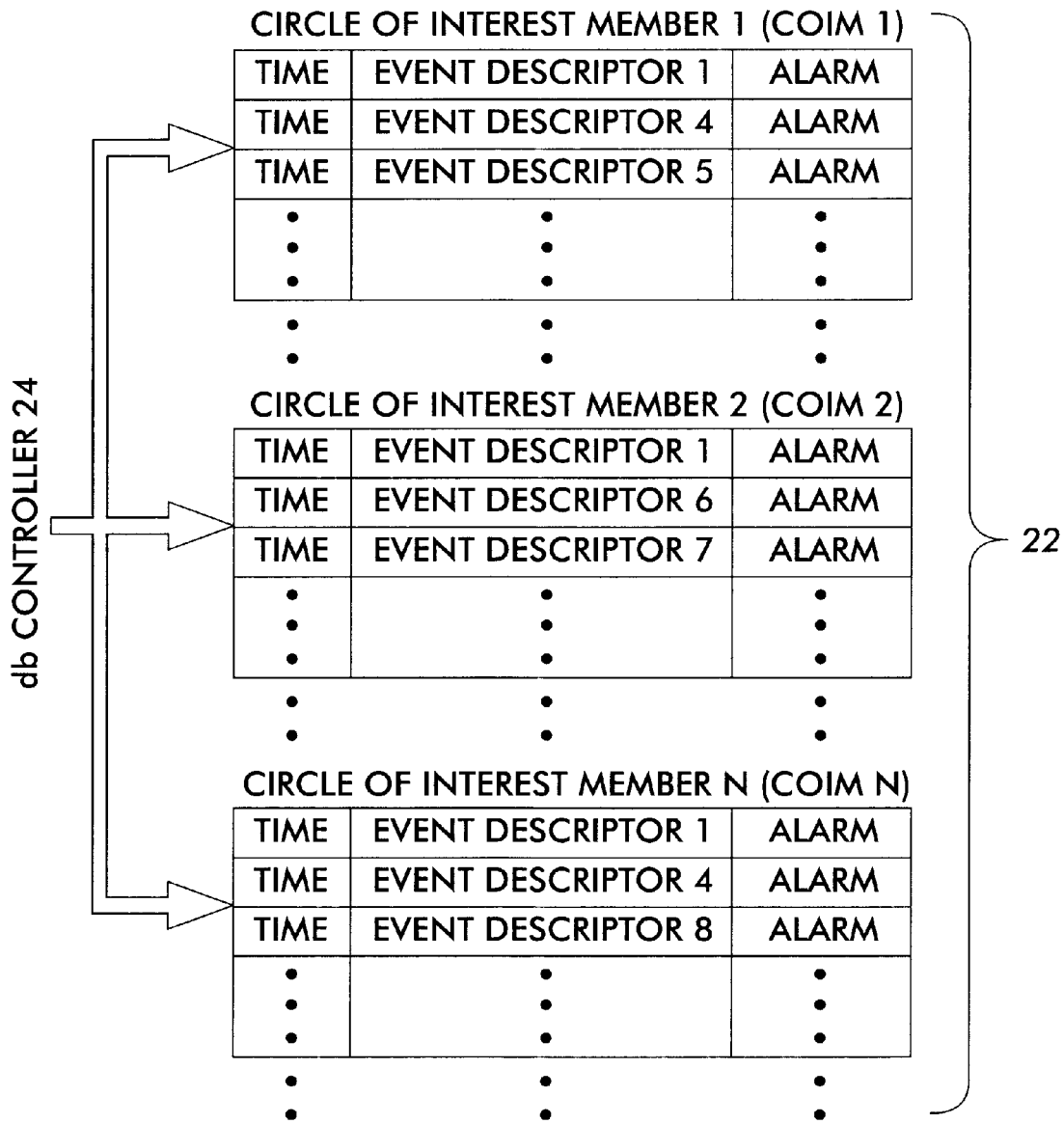
FIG. 6 is an elevational view of a database arrangement contemplated by the flow diagram of FIG. 5.

Referring now to FIGS. 5 and 6, a first downloading embodiment is described. In the first downloading embodiment, programmed information is distributed over one or more databases 22. Initially, in the process of FIG. 5, programmed information is (via step 64) downloaded from the PETMS 12 (FIG. 1) to the personal computer 25 of download platform(s) 12. The information is then transmitted from this personal computer 25 to the database controller 24 where each recipient is identified, via step 66. It should be recognized that the preferred embodiments use an extensive definition of "recipient" in that a recipient may be a user (e.g. "SON1") or a machine location (e.g. a computer IP address).

For ease of discussion, it is assumed that the programmed information arriving at the database(s) 22 (via step 66) corresponds with N recipients. In accordance with the first downloading embodiment, the database controller 24 identifies each recipient and places that recipient's event related information, via step 68, in his or her dedicated database 22. As the database controller 24 distributes programmed information into appropriate database locations, the indicators associated with the event related information (i.e. the storage indicators) are removed (step 70) because, as will appear below, they are unnecessary for the uploading of the event related information.

Referring specifically to FIG. 6, an exemplary database arrangement corresponding with the first downloading embodiment is shown. In the illustrated approach of FIG. 6, event related information is distributed across database 22-1, 22-2, . . . 22-N, the databases 22-1, 22-2, . . . 22-N corresponding respectively with N event related information recipients. It follows from FIG. 6, that the processing of the indicators (also referred to as "lags") by the db controller 24 (steps 66 and 68) causes information associated various recipients to be distributed across their dedicated databases. As will become apparent from the discussion of FIG. 9, the first downloading embodiment obviates the need to correspond event related information with upload indicators.

Figure 7:
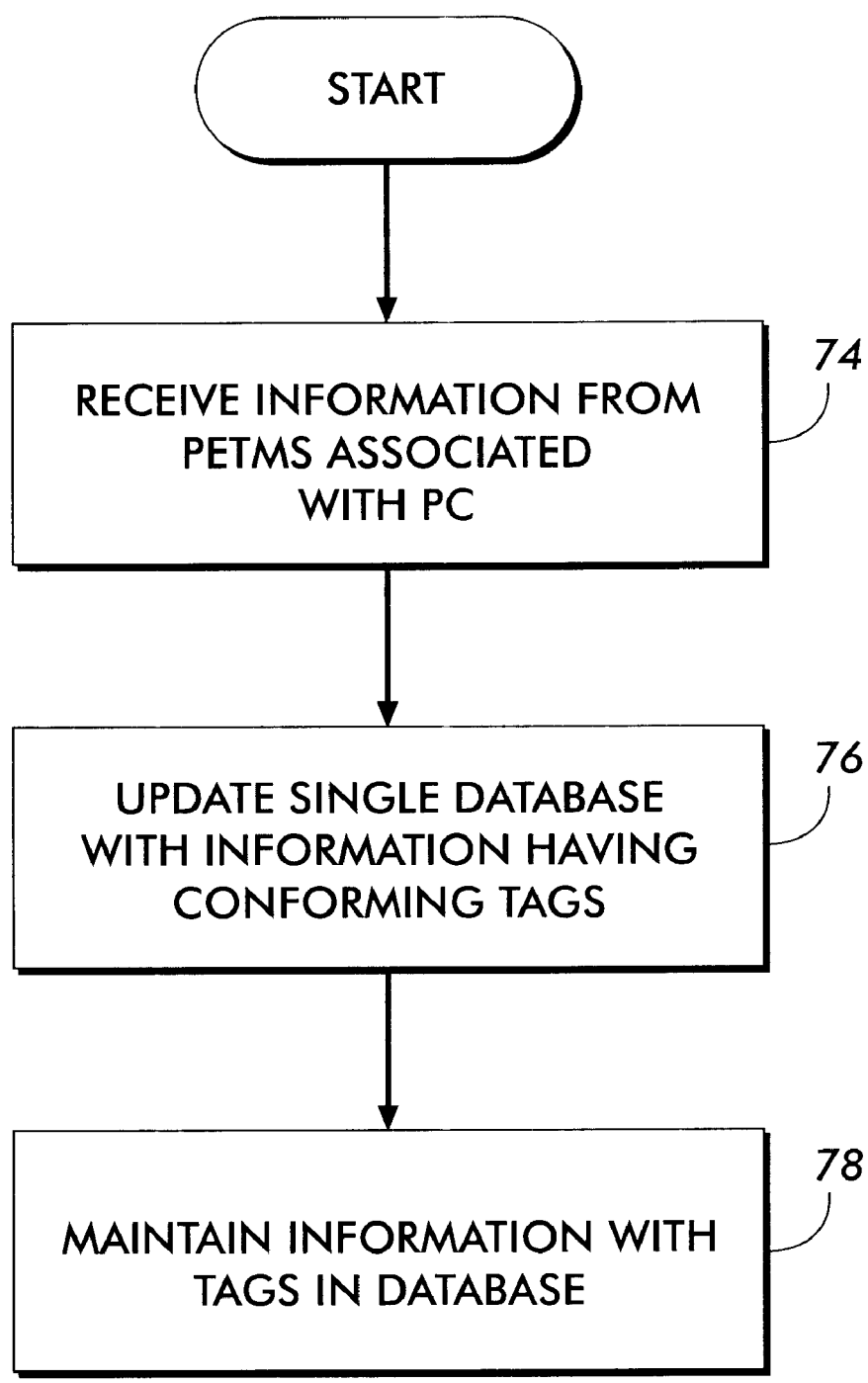
FIG. 7 is flow diagram illustrating a second embodiment of the downloading procedure contemplated by FIG. 4.

Referring now to FIGS. 7 and 8, a second downloading embodiment is described. In the second downloading embodiment, programmed information is inserted into a centralized database, which centralized database may be disposed in one of a plurality of network locations. Initially, in the process of FIG. 7, programmed information is (via step 74) downloaded from the PETMS 12 (FIG. 1) to the personal computer 25 of the download platform(s). The information is then transmitted from this personal computer 24 to the database controller 24. In the second downloading embodiment, the database controller 24 updates the centralized database with the incoming tagged entries (step 76), making sure, via step 78, to leave the tags or indicators (which are viewed as upload indicators) so as to maintain the originally programed relationship between such tags or indicators and their respective entries.

Referring specifically to FIG. 8, an exemplary database arrangement corresponding with the second downloading embodiment is shown. In the illustrated approach of FIG. 6, event related information is inserted into the centralized database 22 in such a manner that each piece of event related information is corresponded with one or more COIMs. For instance, the "Event Descriptor 1" Is corresponded with at least three upload indicators (namely COIM1, COIM2 and COIMN), while the "Event Descriptor 4" is corresponded with at least two upload indicators (namely COIM1 and COIMN). As will become apparent from the discussion of FIG. 10, the maintenance of upload indicators in the centralized database 22 is important to the selective uploading of event related information.

Referring generally to FIGS. 1, 6, 8–10, respective approaches for uploading event related information (or representative information associated therewith) for the first and second embodiments are described. As will appear, the amount of intelligence required by the database controller 24 to manage support upload operations varies as a function of which one of the first and second embodiments is employed in storing the event related information.

Figure 9:
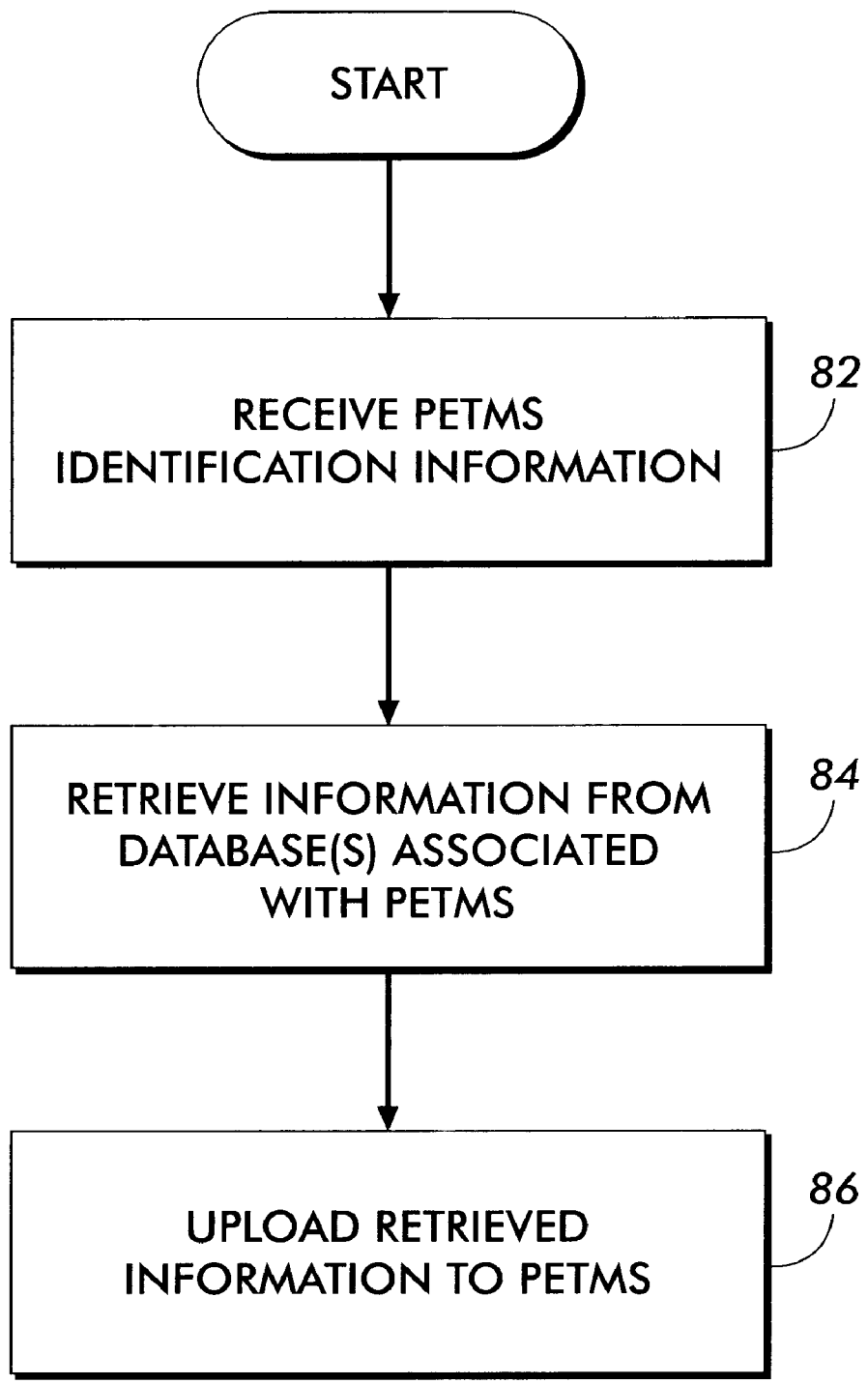
FIG. 9 is a flow diagram illustrating a first embodiment of the uploading procedure contemplated by FIG. 4.

Referring first to FIGS. 1 and 9, selected uploading of event related information in the first embodiment is described. At step 82, a user of PETMS 32 indicates to the database controller 24 a desire to obtain at least a part of the information currently pending in the user's dedicated database 22. This indication can be provided by way of a conventional search query, which, in one example, might be expressed in a Boolean syntax for the sake of narrowing a scope of the search. In order to maintain security and/or privacy of the database(s) 22, the process of FIG. 9 requires a suitable password, identification or the like from a requester as a pre-requisite for searching the database(s) 22. Assuming that the database controller 24 authenticates/authorizes the user, then a search is performed to locate the user's dedicated database 22. In turn, requested entries are then retrieved from the dedicated database 22 (step 84) and provided to the user by way an uploading step 86.

Referring to both FIGS. 6 and 9, a fuller comprehension of the uploading process for the first embodiment can be obtained. Assume, for example, that the user is COIM1, and that such user provides an appropriate password by way of step 82. The database controller 24 then searches the dedicated databases 22 and locates the database 22 belonging to COIM1. The database controller then uploads part or all of the entries in COIM1's dedicated database. In one example, COIM1 may only wish to be apprised of entries stored in his or her dedicated database after a given date provided by his or her query.

Figure 10:
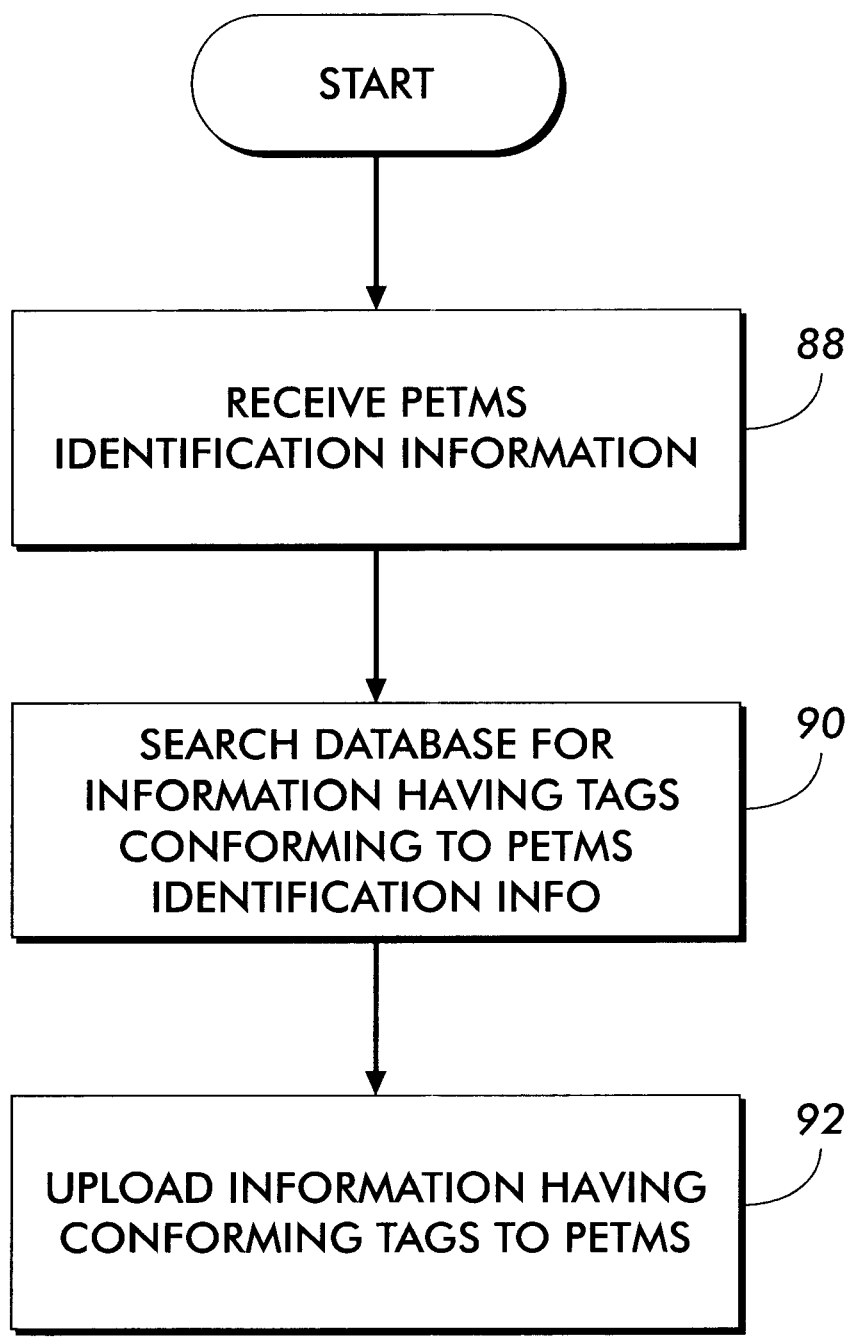
FIG. 10 is a flow diagram illustrating a second embodiment of the uploading procedure contemplated by FIG. 4.

Referring next to FIGS. 1 and 10, selected uploading of event related information in the second embodiment is described. As described above with respect to step 82 (FIG. 9), the user is required to provide an identification (step 88) and assuming that such identification is provided, a search of the database is performed at step 90. Pursuant to such search, the database controller 24 seeks to identify all entries conforming with the user's query. In the case of a query simply seeking all event related information corresponding with the user, the database controller 24 causes all entries tagged for the user to be uploaded to the user's PETMS 32 (step 92).

Referring to both FIGS. 8 and 10, a fuller comprehension of the uploading process for the second embodiment can be obtained. Assume, as above, that the user is COIM1, and that such user again provides an appropriate password by way of step 82. The database controller 24 then searches the centralized database 22 to locate all event related information entries associated with COIM1. The entry location search is, in essence, driven by a recognition of the upload indicators corresponding with COIM1. The database controller 24 then uploads copies of all entries having a COIM1 upload indicator. In the example of FIG. 8, the database will upload information associated with Event Descriptor 1 and Event Descriptor 2 to COIM1's PETMS 32.

Going back to FIGS. 1–3, a detailed description of another preferred information "tagging" routine is now provided. In this embodiment the tagging routine is the same as described above. As noted before, the system, for each piece of event related information (i.e. each entry under "EVENT DESCRIPTION") provides a "SELF" default indication. This default indicator designates that a given piece of event related information is to be made accessible to its owner even when the given piece of event related information is stored on a multi-user PC, such as a home PC, 25. In one instance, the owner can maintain just the SELF designation so that the corresponding event related information is accessible to just the owner. In another instance, however, the owner may make the corresponding event related information available to one or more recipients who, by one means or another, have access to a calendar database which is capable of receiving the event related information being downloaded or off-loaded from the PETMS.

The process for programming the CIRCLE OF INTEREST for this embodiment is the same as described above. In this embodiment, the composite of entries selected in COIM block 60 is referred to below as a "storage" or "upload" indicator. This is because the composite of entries, in a first downloading embodiment, facilitates storage of event related information in one or more personal calendar databases residing on the multi-user PC, and the composite of entries, in a second uploading embodiment, facilitates uploading of event related information to designated recipients. Further detail regarding use of the storage and upload indicators will be provided below. An example in which a piece of programmed information is transmitted from the PETMS 30 to the multi-user personal computer follows below.

In the example, the piece of programmed information is downloaded from the PETMS 30 to the multi-user personal computer via a PETMS/personal computer downloading approach of the type described above. Referring generally to FIG. 4, a schematic overview of the system for routing programmed information from the PETMS 12 to the databases of the multi-user PC is shown. In the illustrated overview, each piece of programmed information is routed to one or more databases residing in the memory of the multi-user PC.

Referring now to FIGS. 5 and 6, a first downloading version of this embodiment is described. In the first downloading version, programmed information is distributed over one or more databases 22. initially, in the process of FIG. 5, programmed information is (via step 64) downloaded from the PETMS 12 (FIG. 1) to the multi-user personal computer 25. The information is then received by a database controller 24 where each recipient is identified, via step 66.

For ease of discussion, it is assumed that the programmed information arriving at the databases 22 (via step 66) corresponds with N recipients. In accordance with the first downloading embodiment, the database controller 24 identifies each recipient and places that recipient's event related information, via step 68, in his or her dedicated database 22 residing on the multi-user PC. As the database controller 24 distributes programmed information into appropriate database locations, the indicators associated with the event related information (i.e. the storage indicators) are removed (step 70) because, as discussed above, they are unnecessary for the uploading of the event related information from the multi-user PC to another identified PETMS.

Referring now to FIGS. 7 and 8, a second downloading version of this embodiment is described. In the second downloading embodiment, programmed information is inserted into a centralized database, residing on the multi-user PC. Initially, in the process of FIG. 7, programmed information is (via step 74) downloaded from the PETMS 12 to the multi-user personal computer. The information is then received by the database controller. In the second downloading version, the database controller 24 updates the centralized database with the incoming tagged entries (step 76), making sure, via step 78, to leave the tags or indicators (which are viewed as upload indicators) so as to maintain the originally programmed relationship between such tags or indicators and their respective entries.

Respective approaches for uploading event related information (or representative information associated therewith) are as described above.

Referring first to FIGS. 1 and 9, selected uploading of event related information in the first version is described. At step 82, a user of PETMS 32 indicates to the database controller 24 a desire to obtain at least a part of the information currently pending in the user's dedicated database 22 residing on the multi-user PC. In order to maintain security and/or privacy of the database 22, the process of FIG. 9 requires a suitable password, identification or the like from a requester as a pre-requisite for accessing the database 22. Assuming that the database controller 24 authenticates/authorizes the user, then requested entries are then retrieved from the dedicated database 22 (step 84) and provided to the user by way an uploading step 86.

Referring to both FIGS. 6 and 9, a fuller comprehension of the uploading process for the first version can be obtained. Assume, for example, that the user is COIM1, and that such user provides an appropriate password by way of step 82. The database controller 24 then locates the database 22 belonging to COIM1. The database controller then uploads part or all of the entries in COIM1's dedicated database. In one example, COIM1 may only wish to be apprised of entries stored in his or her dedicated database after a given date provided by a query.

Referring next to FIGS. 1 and 10, selected uploading of event related information in the second version is described. As described above with respect to step 82 (FIG. 9), the user is required to provide an identification (step 88) and assuming that such identification is provided, a search of the central database is performed at step 90. Pursuant to such search, the database controller 24 seeks to identify all entries conforming with the user's query. In the case of a query simply seeking all event related information corresponding with the user, the database controller 24 causes all entries tagged for the user to be uploaded to the user's PETMS 32 (step 92).

Referring to both FIGS. 8 and 10, a fuller comprehension of the uploading process for the second version can be obtained. Assume, as above, that the user is COIM1, and that such user again provides an appropriate password by way of step 82. The database controller 24 then searches the centralized database 22 to locate all event related information entries associated with COIM1. The entry location search is, in essence, driven by a recognition of the upload indicators corresponding with COIM1. The database controller 24 then uploads copies of all entries having a COIM1 upload indicator. In the example of FIG. 8, the database will upload information associated with Event Descriptor 1 and Event Descriptor 2 to COIM1's PETMS 32.

Numerous features of the above-described embodiments will be appreciated by those skilled in the art:

First, the above-described information distribution system permits event related information to be distributed among PETMS users in a manner that promotes flexibility while maximizing privacy. By programming a given piece of information with a "tag", the owner of such programmed information can insure that the corresponding information will only be received by those with a "need to know". At the same time, the owner can, with the application of each tag, expand and contract the number of recipients for each piece of information "at will". Hence, as contemplated, the tagging system permits unlimited customizing of recipient groups in that the recipient group for any given piece of information need never be the same. However, the present invention can also include predetermined distribution lists or personal groups of COIMs which can be easily selected without having to add each individual COIM to an event.

Second, the information distribution provides two advantageous storage structures. In one embodiment, the tags are used as storage indicators to distribute information across multiple databases. In this way the programmed information is filtered "up front", thereby greatly facilitating an uploading process. In another embodiment, the tags are used as upload indicators to facilitate organization within a centralized database. In this way, an extremely high level of user differentiation can be achieved with just one database since the tags can be used to selectively "mask" the database for each user. That is, through use of the tags, the user can only "see" that information in the database which is intended for his or her "eyes".

Third, by using a web-based system, the information owner can maximize the number of locations to which any given piece of information can be transmitted. Essentially, everyone on the world wide web becomes a potential recipient for a given piece of information.

Fourth, the recipient of the programmed information is not limited to just an individual. In one example, a given tag can be used to direct a piece of information to a given individual, while in another example, a given tag can be used to direct a given piece of information to a predesignated machine or even geographical location.

Finally, the disclosed information distribution system is well suited for use across multiple platforms. While an exemplary system uses at least one downloading computer, at least one uploading computer and a server computer, configuration flexibility is virtually unlimited. Downloading and uploading can be achieved with a device other than a computer, while storage of information can be obtained across many storage sites other than a centralized server.

What is claimed is:

1. A data processing system, comprising:
    a downloading subsystem for creating a first event related entry including a first storage indicator and a second event related entry including a second storage indicator;
    a first database and a second database, both of which first and second databases communicate with said downloading subsystem;
    wherein,(i) the first storage indicator is used for causing a copy of the first event related entry to be stored in the first database, but not the second database, and (ii) the second storage indicator is used for causing a copy of the second event related entry to be stored in the second database, but not the first database.

2. The data processing system of claim 1, further comprising a first client and a second client, wherein said first client is corresponded with the first database and said second client is corresponded with the second database.

3. The data processing system of claim 1, wherein said downloading subsystem includes a personal electronic time management system, and wherein the first and second event related entries are created with said personal electronic time management system.

4. The data processing system of claim 3, wherein said downloading subsystem includes a personal computer communicating with said personal electronic time management system, and wherein said personal computer is used to store the first and second event related entries with their respective first and second upload indicators in said first and second databases.

5. The data processing system of claim 1, wherein said downloading subsystem includes a client communicatively coupled with a server by way of a network connection, further comprising configuring the server to include each of said first and second databases.

6. The data processing system of claim 5, wherein the network comprises an internet connection, the server comprises an internet server, and the client includes a subsystem for transmitting information over the internet connection to the internet server, and wherein the first and second event related entries are transmitted over the internet connection to the internet server with the subsystem for transmitting.

7. The data processing system of claim 1, wherein the first storage indicator corresponds with a first user and the second storage indicator corresponds with a second user.

8. The data processing system of claim 1, wherein the first storage indicator corresponds with a first client apparatus and the second storage indicator corresponds with a second client apparatus.

9. The data processing system of claim 1, wherein the first storage indicator corresponds with a client apparatus and the second storage indicator corresponds with a user.

10. A data processing system, comprising:
a downloading subsystem for creating a first event related entry including a first upload indicator and a second event related entry including a second upload indicator;
a first uploading subsystem and a second uploading subsystem, both of which are communicatively coupled with said downloading subsystem;
said downloading subsystem including a database communicatively coupled to each of said first uploading subsystem and said second uploading subsystem, said database storing the first and second event related entries along with their respective first and second upload indicators; and
wherein, (i) the first upload indicator is used for permitting the first uploading subsystem to upload a copy of at least a portion of the first event related entry, but not any portion of the second event related entry, and (ii) the second upload indicator is used for permitting the second uploading subsystem to upload at least a portion of the second event related entry, but not any portion of the first event related entry.

11. The data processing system of 10, wherein said downloading subsystem includes a personal electronic time management system for creating the first and second event related entries.

12. The data processing system of claim 11, wherein said downloading subsystem includes a personal computer communicating with the personal electronic time management system, wherein said personal computer is used to store the first and second event related entries with their respective first and second upload indicators in the database.

13. The data processing system of claim 12, wherein said downloading subsystem further includes a server communicating with said personal computer by way of a network connection, and wherein said database is configured in said database.

14. The data processing system of claim 13, wherein:
the downloading subsystem and the first uploading subsystem are communicatively coupled with one another by way of an internet connection;
each of the downloading subsystem and the first uploading subsystem include a subsystem for transmitting and/or receiving information by way of the internet connection; and
said downloading subsystem stores the first and second event related entries in said database with its corresponding subsystem for transmitting and receiving, and said first uploading subsystem uploads the copy of the at least portion of the first event related entry via the internet connection with its corresponding subsystem for transmitting and/or receiving.

15. The data processing system of claim 14, wherein said downloading subsystem includes an internet based server disposed remotely of said first uploading subsystem, and wherein said database is configured on the internet based server.

16. The data processing system of claim 10, wherein the first upload indicator corresponds with a first user and the second upload indicator corresponds with a second user.

17. The data processing system of claim 10, wherein the first upload indicator corresponds with a first client apparatus and the second upload indicator corresponds with a second client apparatus.

18. The data processing system of claim 10, wherein the first upload indicator corresponds with a client apparatus and the second upload indicator corresponds with a user.

19. In a data processing system in which a downloading subsystem communicates with both a first uploading subsystem and a second uploading subsystem, wherein a database for storing event related entries is communicatively coupled with each of the downloading subsystem, the first uploading subsystem and the second uploading subsystem, a method for controlling the flow of information associated with the event related entries between the downloading subsystem and each of the first and second uploading subsystems, comprising:
a) creating, with the downloading subsystem, a first event related entry including a first upload indicator and a second event related entry including a second upload indicator;
b) storing the first and second related entries in the database; and
c) using, (i) the first upload indicator to permit the first uploading subsystem to upload a copy of at least a portion of the first event related entry, but not any of the second event related entry, and (ii) the second upload indicator to permit the second uploading subsystem to upload at least a portion of the second event related entry, but not any of the first event related entry.

20. The method of claim 19, in which the downloading subsystem includes a personal electronic time management system, wherein said (a) includes creating the first and second event related entries on the personal electronic time management system.

21. The method of claim 20, in which the downloading subsystem includes a personal computer communicating with the personal electronic time management system, wherein said (b) includes using the personal computer to store the first and second event related entries with their respective first and second upload indicators in the database.

22. The method of claim 21, in which the downloading subsystem includes a server communicating with the personal computer via a network connection, further comprising configuring the database in the server.

23. The method of claim 22, in which the downloading subsystem and the first uploading subsystem are communicatively coupled with one another by way of an internet connection, and in which each of the downloading subsystem and the first uploading subsystem include a subsystem for transmitting and/or receiving information by way of the internet connection, wherein the downloading subsystem stores the first and second event related entries in the database with its corresponding subsystem for transmitting and/or receiving, and the first uploading subsystem uploads the first event related off the internet connection with its corresponding subsystem for transmitting and/or receiving.

24. The method of claim 23, in which the downloading subsystem includes an internet based server disposed remotely of the first uploading subsystem, further comprising configuring the database on the internet based server.

25. The method of claim 19, in which the data processing system includes a third uploading subsystem communicatively coupled with the downloading subsystem, further comprising permitting the third uploading subsystem to upload respective copies of at least a portion of the first event related entry and at least a portion of the second event related entry.

26. The method of claim 19, further comprising:

(d) creating a third event related entry with the downloading subsystem, wherein the third event related entry includes a third upload indicator;

(e) storing the third event related entry in the database; and (f) using the third upload indicator to permit each of the first and second uploading subsystems to upload a copy at least a portion of the third event related entry.

27. In a data processing system in which a downloading subsystem communicates with both a first database and a second database, wherein one or more event related entries are stored in each of the first and second databases, a method for controlling the flow of information between the downloading subsystem and each of the first and second databases, comprising:

a) creating, with the downloading subsystem, a first event related entry including a first storage indicator and a second event related entry including a second storage indicator; and b) using, (i) the first storage indicator to cause a copy of the first event related entry to be stored in the first database, but not the second database, and (ii) the second storage indicator to cause a copy of the second event related entry to be stored in the second database, but not the first database.

28. The method of claim 27, in which the data processing system further includes a first client and a second client, further comprising corresponding the first database with the first client, but not the second client, and corresponding the second client with the second database, but not the first database.

29. The method of claim 28, in which the downloading subsystem includes a personal electronic time management system, wherein said (a) includes creating the first and second event related entries on the personal electronic time management system.

30. The method of claim 29, in which the downloading subsystem includes a personal computer communicating with the personal electronic time management system, wherein said (b) includes using the personal computer to store the first and second event related entries with their respective first and second upload indicators in the first and second databases.

31. The method of claim 29, in which the downloading subsystem includes a client communicatively coupled with a server by way of a network connection, further comprising configuring the server to include each of the first and second databases.

32. The method of claim 31, in which the network comprises an internet connection, the server comprises an internet server, and the client includes a subsystem for transmitting information over the internet connection to the internet server, further comprising transmitting the first and second event related entries over the internet connection to the internet server with the subsystem for transmitting.

* * * * *